United States Patent [19]

Throop et al.

[11] Patent Number: 4,741,042

[45] Date of Patent: Apr. 26, 1988

[54] IMAGE PROCESSING SYSTEM FOR DETECTING BRUISES ON FRUIT

[75] Inventors: James A. Throop, Ithaca; Gerald E. Rehkugler, Dryden, both of N.Y.

[73] Assignee: Cornell Research Foundation, Inc., Ithaca, N.Y.

[21] Appl. No.: 942,108

[22] Filed: Dec. 16, 1986

[51] Int. Cl.$^4$ .............................................. G06K 9/00
[52] U.S. Cl. ......................................... 382/1; 382/8; 209/701; 209/587
[58] Field of Search ................ 382/1, 8, 28; 209/587, 209/701

[56] References Cited

U.S. PATENT DOCUMENTS

| | | | |
|---|---|---|---|
| 3,225,892 | 5/1957 | Keesling | 198/382 |
| 3,867,041 | 2/1975 | Brown et al. | 250/341 |
| 4,122,951 | 10/1978 | Alaminos | 209/587 |
| 4,308,959 | 1/1982 | Hoover et al. | 209/587 |
| 4,324,335 | 4/1982 | Conway et al. | 209/587 |
| 4,330,062 | 5/1982 | Conway et al. | 209/582 |
| 4,493,420 | 1/1985 | Dennis | 209/587 |
| 4,515,275 | 5/1985 | Mills et al. | 209/587 |
| 4,534,470 | 8/1985 | Mills | 209/587 |
| 4,645,080 | 2/1987 | Scopatz | 209/587 |

OTHER PUBLICATIONS

Graf, G. L., G. E. Rehkugler, W. F. Miller and J. A. Throop, 1981, Automatic Detection of Surface Flaws on Apples Using Digital Image Processing, ASAE Paper No. 81-3537, American Society of Agricultural Engineers, St. Joseph, MI.
Graf, G. L. 1982, Automatic Detection of Surface Blemishes on Apples Using Digital Image Processing, Ph.D. Thesis, Cornell University, Ithaca, NY.
Taylor, R. W., G. E. Rehkugler and J. A. Throop, 1984, Apple Briuse Detection Using a Digital Line Scan Camera System, Agricultural Electronics—1983 and Beyond, American Society of Agricultural Engineers, St. Joseph, MI, pp. 652–662.
Taylor, R. W. and G. E. Rehkugler, 1985, Development of a System for Automated Detection of Apple Bruises, Porceedings of the Agri-Mation 1 Conference, Society of Manufacturing Engineers/American Society of Agricultural Engineers, Feb. 25–28, Chicago, IL, American Society of Agricultural Engineers, St. Joseph, MI.
Taylor, R. W. 1985, Automated Detection of Apple Bruises, M.S. Thesis, Cornell University, Ithaca, NY.
Rehkugler, G. E. and J. A. Throop, 1973, An Optical-Mechanical Bruised Apple Sorter, ASAE Paper No. 73-1526, American Society of Agricultural Engineers, St. Joseph, MI.
Rehkugler, G. E. and J. A. Throop, 1976, Optical-Mechanical Briused Apple Sorters, Quality Detection in Foods, compiled by J. J. Gaffney, American Society of Agricultural Engineers, St. Joseph, MI, pp. 185–188.
Rehkugler, G. E., W. F. Millier, R. A. Pellerin and J. A. Throop, 1976, Design Criteria for Apple Bruise Detection by Infrared Radiation, Paper presented at the First International Congress on Engineering and Food, Boston, MA, sponsored by the American Society of Agricultural Engineers, St. Joseph, MI.
Reid, W. S. 1976, Optical Detection of Apple Skin, Bruise, Flesh, Stem, and Calyx, J. Agr. Engr. Res., 21(3):291–295.

Primary Examiner—Leo H. Boudreau
Assistant Examiner—Steven Brim
Attorney, Agent, or Firm—Jones, Tullar, & Cooper

[57] ABSTRACT

An image processing technique for detecting and measuring the size of bruises on fruit, such as apples, is disclosed. A line scan camera is employed to obtain a gray level image of each piece of fruit as it is rotated in front of the camera. The image is digitized, and transferred to a computer which performs a plurality of steps on the image to determine the sizes of any bruises on the fruit from the gray level data. The image data is filtered to remove interference due to pixel-to-pixel variations in the camera, background noise, etc., and is then thresholded to obtain a binary image representation. Clusters of zeros in the resulting binary image that are representative of potential bruises are analyzed to determine their size and shape. If the shape of the cluster is nearly circular, it is determined to be a bruise. From this information, the amount of bruise area on the fruit may be determined, and the fruit graded accordingly.

8 Claims, 2 Drawing Sheets

APPLE IMAGE PROCESSING
PROGRAM FLOW CHART

APPLE IMAGE PROCESSING
PROGRAM FLOW CHART

IMAGE PROCESSING SYSTEM FOR DETECTING BRUISES ON FRUIT

BACKGROUND OF THE INVENTION

The present invention relates to an automated system for detecting bruises on apples, or similar fruit, which employs an unique image processing technique to distinguish bruised tissue from non-bruised tissue.

Apples are graded according to the amount of bruised skin on their surface. In New York State, for example, apples for processing are reduced in value when greater than 5% of the total apple surface is bruised. Fresh market apples, on the other hand, are graded not only on the size of bruises, but also on the number of bruises. Most apples are graded for size and bruises by U.S.D.A. inspectors who examine a small portion of apples randomly selected from each truck load. Differences in inspector evaluation methods and judgement allow for significant and undesirable variations in the application of the U.S.D.A. standards. What would be desirable then, is for an automated system to be devised which can quickly and accurately determine the amount of bruising on an apple's surface.

In recent years, considerable development work on automated apple grading systems has been conducted. For example, U.S. Pat. No. 3,867,041, to Brown et al., discloses a method for detecting bruises in fruit which employs the use of diffuse surface reflectance of near infrared radiation to differentiate bruised tissue from non-bruised tissue. In ASAE Paper No. 81-3537 (1981), Graf et al. demonstrates this diffuse reflectance detection technique using digital imaging as a means to perform the detection by a non-contact process in a laboratory environment. Experimentation with different image analysis techniques showed that a multivariable linear statistical classification of each pixel in an apple image to be the most successful approach to classify imaged apple tissue bruised or non-bruised. The classification algorithms classified bruised and non-bruised tissue areas as well as a human inspector.

In 1984, R. W. Taylor et al. demonstrated that a digital line scan camera could be used in this system in place of a digital matrix camera (Taylor, R. W., Rehkugler, G. E., Throop, J. A., *Apple Bruise Detection Using a Digital Line Scan Camera System*, Agricultural Electronics-1983 and Beyond. American Society of Agricultural Engineers, pp. 652–662). This eliminated perspective spatial distortion in one dimension and allowed, with careful camera placement, the elimination of the background in the image. Taylor found that the quadratic statistical classification process used was not robust enough to handle the variability of the data. Due to the lack of manufactured uniformity between pixels, an elaborate, time-consuming process of normalization of pixel response was required to improve this classification process. The conversion of Taylor's algorithms from a quadratic to a linear classifier has failed to improve their performance. Therefore, a non-statistical approach for image analysis for classifying apple tissue and a new algorithm was needed. A suitable algorithm and classification process would be one that gave equal or better results of classification on the same apple images as the algorithm used by Graf et al.

SUMMARY OF THE INVENTION

It is therefore the object of the present invention to provide an improved digital image processing technique for use with an automated fruit grading system which allows the amount of bruise area on apples, or similar fruit, to be quickly and accurately determined.

This, and other objects of the present invention are achieved through the use of a line scan camera such as that employed by Taylor, and a unique image processing technique that eliminates the time consuming normalization process employed by Taylor. In addition, the processing technique eliminates the need for careful camera placement by enabling the background in the image to be filtered out.

More particularly, the present invention utilizes an apple or fruit handling system comprised of an orienting section, and a spindling and imaging section. A continuously moving transport cup conveyor is employed for transporting fruit to the spindling and imaging section. Each transport cup is conical in shape for reception of a single apple, or similar fruit, and has an open bottom so that a spinning orienting wheel can engage the bottom of the fruit as it approaches the spindling and imaging section. The orienting wheel insures that the stem-calyx axis of the apple will remain vertical during imaging, and that only the cheek of the apple will be exposed to the line scan camera. This type of fruit orienting device is disclosed in U.S. Pat. No. 3,225,892 to Keesling, which is hereby incorporated by reference.

Near each transport cup is a single extended pin coupler link used to engage a spindle mechanism at the spindling and imaging section, and carry it along with each transport cup. The spindle mechanism is mounted on two parallel linear motion guides and is spring loaded to resist movement in the direction of the transport cup travel. After traveling through its sequence of operations, the spindle mechanism springs backward to be picked up by the next transport cup drive pin.

The purpose of the spindle mechanism is to engage each apple, and raise it out of its transport cup so that the apple may be viewed by a line scan camera. In addition, the spindle mechanism includes a drive motor which rotates the apple in front of the camera so that an image of the apple's entire surface may be obtained.

A 64 pixel linear photodiode array camera is mounted on a pivot arm that is attached to the spindle mechanism, and causes the camera to rotate slightly as the transport cup moves the spindle mechanism, so that the camera will remain focused on the fruit center as it moves past the camera. The camera pivot arm returns by spring force to the initial starting point every time the spindle mechanism reciprocates to be picked up by the next transport cup.

An optoelectronic shaft encoder is mounted on the spindle mechanism, and has a 250 pulse per revolution output that is supplied as start pulses to the camera, so that a two-dimensional 64×250 pixel image is recorded for each apple. The shaft encoder signal is withheld from the camera until an optoelectronic switch disposed near the camera pivot arm is switched on due to movement of the pivot arm. This allows the camera to obtain an image. An interface is provided which includes an 8 bit A to D converter that digitizes the image data and transfers it to the memory of a data processor, such as a minicomputer.

A slightly translucent acrylic plastic diffuser is disposed in front of four tubular tungsten bulbs which are mounted in an apple lighting box for illuminating the apples in accordance with the teachings of the Brown et al. patent. This patent is also hereby incorporated by reference. A long pass filter is placed in front of the camera lens to eliminate the transmittance of radiation of less than 750 nanometers in wavelength.

The primary obstacle in easily defining the difference between bruised and non-bruised apple tissue in an image is that the reflectance difference of these two tissues is only between 10 and 20 percent gray level difference. Due to indistinct boundaries between the regions, noise present in the images, and pixel-to-pixel variations in manufacturing, classification of tissue types becomes even more difficult.

As compared to a matrix digital image such as was employed by Graf et al., the pixel variations become very pronounced in the line scan digital image. In the 64 pixel×250 pixel image, each of 250 pixel values in a row have been sensed by the same camera pixel. This results in a gray level image composed of light and dark rows characteristic of individual pixels. Other gray level changes due to bruising, uneven lighting, and noise are then superimposed on the individual pixel response. If these variations are removed by a normalization process (Taylor, 1984), then the classification of tissue type by gray level becomes clearer. To avoid this normalization process and the processing time it requires, the present invention makes use of a unique image processing technique which processes each image on a row-by-row basis.

This processing technique includes the following steps. Each of the 250 pixel values in a single row of the gray level image is an 8 bit data word between 0 and 255, with 0 representing black, and 255 representing white. A digital linear operator applied to the gray level image performs a low-pass filtering of the original image on each of the 64 rows, on a row-by-row basis. This digital operator takes a user selected filter pixel width, such as the first 31 pixel values of a row, finds their average value, and assigns the average value to the middle or sixteenth pixel of the 31 pixel values. The average of pixel values 2-32 is next found, and assigned to pixel 17. This process continues until all 250 pixel values in each of the 64 rows have been replaced by a 31 pixel average. For the last 30 pixels in each row, a wrap around technique is employed to obtain this average. Thus, for example, the value for pixel 250 will be the average of the original values of pixels 235-250, and pixels 1-15.

The low pass filtering technique thus effectively substitutes each pixel value in a row of data words, with an average of that value and the values of a plurality of adjacent pixel values, in the same row. It should be noted that the first and last pixel values in a row can be said to be adjacent to one another, since the two-dimensional image that is formed as the apple rotates is actually "wrapped around" on itself.

This low pass filtering technique has the effect of smoothing the image so that sharp transitions in the image due, for example, to bruise edges are eliminated. Thus, the resulting low pass filtered image tends to represent the undesirable part of the original image which is due to pixel-to-pixel variations, background, noise, etc.

By next subtracting the original image from the low pass filtered image, and then setting all negative values to zero, a resulting filtered image is obtained which represents the gray level of the apple's surface, without adverse effects from pixel variations, background, or noise. The image thus obtained is inverted, however, with zeros representing light areas, and positive values representing dark areas on the apple's surface.

The resultant filtered image is next thresholded at an arbitrarily selected gray level difference to form a binary image which has 255 as pixel values everywhere except at the original darkest values of the gray level image. These darkest values are assigned the value 0. Thus, any data words having values at or above the threshold will be assigned the value 0, while those data words having values below the threshold, will be assigned the value 255. The value of the threshold is varied in accordance with image quality, background lighting, etc., and typically is set at a value between 0 and 30.

Next, the obtained binary image is processed to eliminate stray zeros or 255's. Thus, for example, if a zero valued data word is located in a row, and is surrounded by data words having 255 as their values, that zero valued data word is changed to 255. Similarly, if a 255 valued data word is found surrounded by a cluster of zero valued data words, that data word is changed to zero. This process helps to further filter out responses that are not due to bruises.

The binary image is now circularly shifted until no zero valued data words are present in the first column. This is to insure that a cluster of zeros representing a bruise will not be split into two sections in the image, and eliminates complicated "wrap around" processing of the image. If after the entire image is shifted, no column is found having no zeros in it, the user is informed that the threshold value is too low, and must be increased. The above process is then repeated with the new threshold value.

A form of contour following is now applied to each zero valued cluster in the binary image. This locates and counts the perimeter pixels, and counts the total pixels in each cluster for area determination.

Finally, a dimensionless measure of shape, called the thinness ratio, T, is now computed for each cluster of zeros, where $T = 4\pi(A/P^2)$, and where A = area of cluster of zeros, and P = perimeter of cluster of zeros.

From this thinness ratio, the shape of each cluster of zeros in the image can be determined. By thresholding the T value between a minimum and maximum value, only clusters of a nearly circular shape are counted. For a perfect circle, $T = 1$, and thus T is thresholded between some value less than 1 (e.g. 0.4), and some value greater than 1 (e.g. 1.5). Since bruises on apples tend to be circular in shape, the use of the thinness ratio in this manner helps insure that only clusters of zeros that represent bruises will be counted. The area of each counted cluster can now be used to determine the total bruise area, and from this, the apple grade.

BRIEF DESCRIPTION OF THE DRAWINGS

The foregoing and additional objects, features and advantages of the present invention will become apparent to those of skill in the art from the following more detailed consideration thereof taken in conjunction with the accompanying drawings in which.

DETAILED DESCRIPTION OF THE PREFERRED EMBODIMENT

Figure 1:
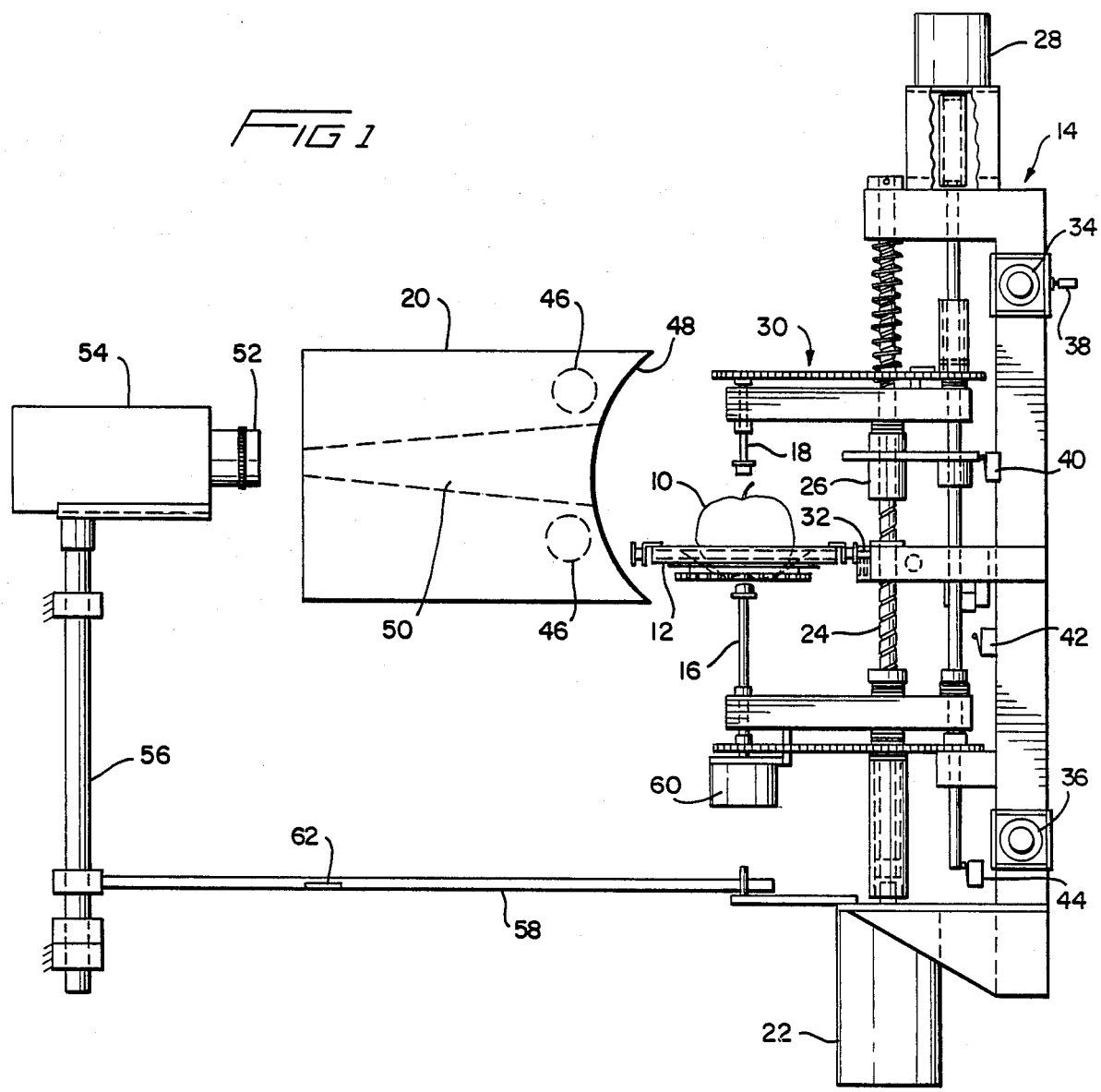
FIG. 1 is a diagrammatic side elevational view of the overall system utilized in the present invention to obtain an image of an apple.

Turning now to a more detailed consideration of the present invention, there is illustrated in FIG. 1, the overall system employed by the present invention to obtain an image of an apple, or similar fruit. Specifically, there is shown in FIG. 1, an apple, or similar piece of fruit 10, disposed in a transport cup 12. It will be understood that a plurality of these transport cups that form a conveyor will be utilized in the system, however, for purposes of the present invention, it is sufficient to illustrate only one such transport cup. Transport cup 12 is shown disposed at a spindling and imaging section of the system, and apple 10 is oriented so that its stem-calyx axis is vertical. This orientation is carried out prior to arrival at the spindling and imaging section by a mechanism similar to that disclosed in U.S. Pat. No. 3,225,892 to Keesling.

The spindling mechanism shown generally at 14 includes a pair of spindles 16 and 18 for lifting the apple out of transport cup 12, and rotating the apple in front of an apple illumination box 20. The lifting of the apple is achieved through the action of a spindle drive motor 22, a ball screw 24, and a ball nut 26, while the rotation of the apple is controlled by an apple rotation drive motor 28, and an associated gear and chain type transmission mechanism generally depicted at 30.

Spindling mechanism 14 is carried along with transport cup 12 by a drive pin 32 on cup 12, and slides along a pair of linear motion guides 34 and 36. A plurality of limit and location switches 38, 40, 42, and 44 are provided on spindling mechanism 14 to control the sequencing of the various movements of the mechanism by associated circuitry, which is not shown.

The imaging section includes apple illumination box 20 which has a plurality of tubular tungsten bulbs 46 disposed therein. A slightly translucent acrylic plastic diffuser 48 is mounted on box 20 in front of bulbs 46 so that apple 10 will be illuminated by diffuse near infrared radiation in accordance with the method set forth in U.S. Pat. No. 3,867,041 to Brown et al. Light reflected off of the surface of apple 10, is directed through a passage 50 in box 20 to a lens 52 of a line scan camera 54. Lens 52 has a long pass filter disposed in front of it (not shown), to eliminate the transmittance of radiation having a wavelength of less than 750 nanometers. Line scan camera 54 is preferably a 64 pixel linear photodiode array camera, such as an EG&G Reticon Model LC 600, and is mounted on a shaft 56. This shaft is connected to a pivot arm 58, which in turn is connected to spindling mechanism 14, and enables the camera to remain focused on the apple as it travels along with the conveyor and spindling mechanism.

To control the operation of line scan camera 54, an optoelectronic shaft encoder 60 is connected to the lower end of spindle 16, which generates 250 electrical pulses for every revolution of the spindle. These pulses are utilized as start pulses for line scan camera 54, and enable a 64×250 pixel image to be recorded for each apple. An optoelectronic switch 62 is provided which is activated by pivot arm 58 that prevents these pulses from being transmitted to the camera until the pivot arm begins to move.

Figure 2:
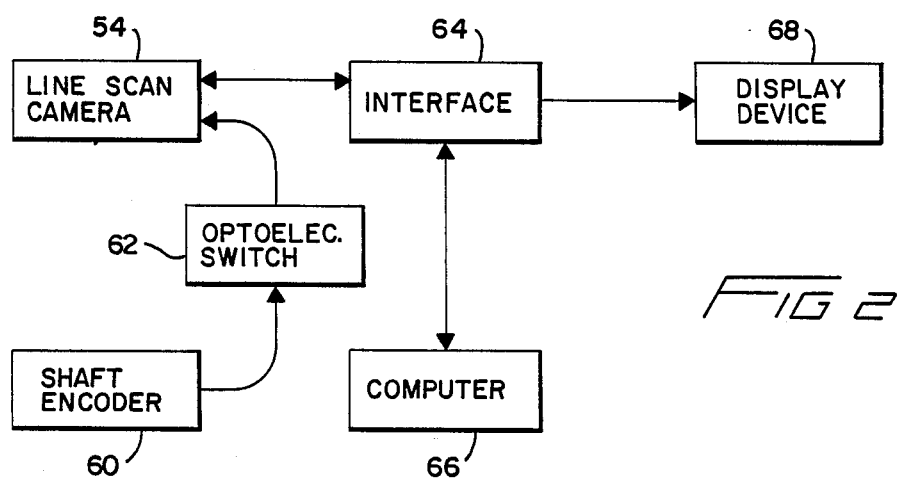
FIG. 2 is a general block diagram of the image circuitry for the present invention.

Turning now to FIG. 2, a general block diagram of the imaging circuitry is illustrated. Specifically, line scan camera 54 is shown as being controlled through optoelectronic switch 62, by shaft encoder 60. An interface 64 is provided which includes an A to D converter (not shown) so that the image data from camera 54 can be digitized, and transferred to either a computer 66, or a display device 68.

Figure 3:
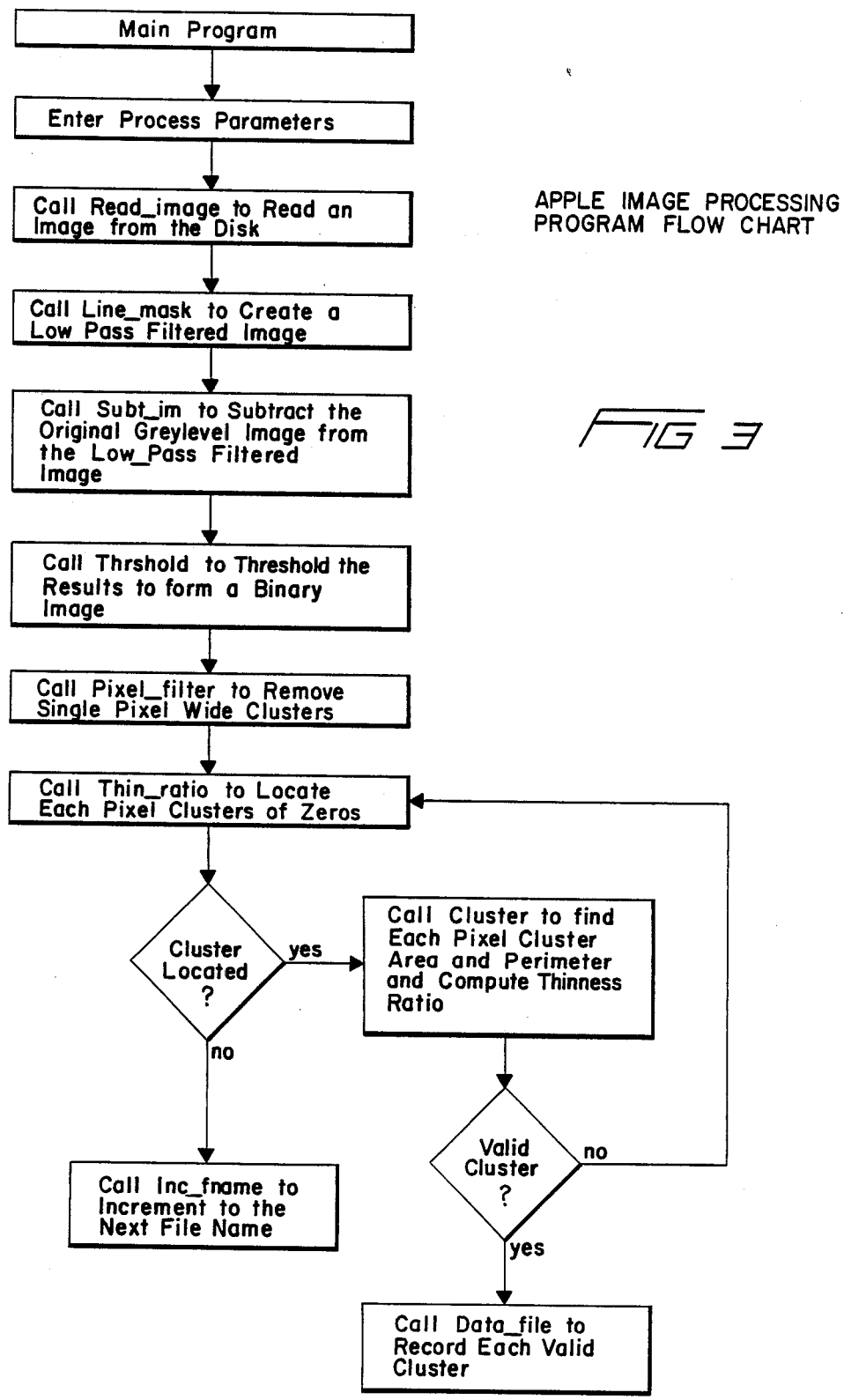
FIG. 3 is a flow chart showing the image processing technique of the present invention.

FIG. 3 shows the flow chart for the image processing technique utilized by computer 66 to detect and calculate the area of any bruises on the surface of apple 10. This process is set forth below, and involves a number of steps which are implemented on the computer by subroutines. A sample program for implementing the process is included at the end of this description as an Appendix, and is hereby incorporated by reference.

After the line scan camera 54 obtains a complete two-dimensional image of the apple, the image data is stored in the computer's memory, such as on a floppy disk. As shown in the flow chart of FIG. 3, after the various process parameters are entered into the computer, the apple image data is read from the disk, and is low pass filtered. This low pass filtering is done on a row-by-row basis for each of the 64 rows of the image, and is achieved in the following manner. Each of the 250 pixels in a row are represented by an 8 bit data word, and have a value between 0 and 255, with 0 representing a totally black image, and 255 representing a totally white image. A digital linear operator that performs the low pass filtering takes a user selected filter pixel width (one of the process parameters), such as the first 31 pixel values of a row, finds their average value, and assigns the average value to the middle or sixteenth of the 31 pixel values. The average of pixel values 2–32 is now found, and assigned to pixel 17. This process continues until all 250 pixel values in each of the 64 rows have been replaced by a 31 pixel average. For the last 30 pixels in each row, a wrap around technique is employed to obtain this average. Thus, for example, the value of pixel 250 will be the average of the original values of pixels 235–250, and pixels 1–15.

The low pass filtering technique thus effectively substitutes each pixel value in a row, with an average of that value and the values of a plurality of adjacent pixel values, in the same row. It should be noted that the first and last pixel values in a row can be said to be adjacent to one another, since the two-dimensional image that is formed as the apple rotates is actually "wrapped around" on itself.

The purpose of the low pass filtering procedure is to smooth out the gray tone image to show only fluctuations of the general background. This is necessary for a number of reasons including: pixel-to-pixel variations created by the line scan camera which generate streaks in the image, indistinct boundaries between regions of the image, and noise present in the image. The low pass filtering technique averages the gray tones, and has the effect of filtering out sharp color transitions which are indicative, for example, of bruise edges.

To obtain a filtered image which represents only variations due to apple bruises, the original gray tone image is subtracted from the low pass filtered image, with the resultant filtered image being effectively the inverse of an image which includes variations due only to bruises. By setting all negative values of the resultant filtered image to zero, only darker portions of the image (those indicative of bruises) will have positive pixel values.

The next step in the process is to threshold the resultant filtered image so that a two-dimensional binary image can be obtained. Thus all data words having a pixel value below the threshold, and thus indicative of unbruised tissue, are set to the value 255, while all data words having a pixel value at or above the threshold, and thus indicative of bruised tissue, are set to the value 0. The value of the threshold is arbitrarily chosen, and is typically somewhere between 0 and 30, depending on image quality, background lighting, etc.

Next, the obtained binary image is processed to eliminate stray zeros or 255's. Thus, for example, if a zero valued data word is located in a row, and is surrounded by data words having 255 as their values, that zero valued data word is changed to 255. Similarly, if a 255 valued data word is found surrounded by a cluster of zero valued data words, that data word is changed to zero. This process helps to further filter out responses that are not due to bruises.

Next, the resultant binary image is circularly shifted until no zero valued data words are present in the first column of the image. The purpose of this is to insure that clusters of zeros representing apple bruises will not show up in two sections of the image, and eliminates complicated "wrap around" processing of the image. If after the entire image is shifted, no column is found having no zeros in it, the user is informed that the threshold value is too low, and must be increased. The above process is then repeated with the new threshold value.

A form of contour following is now applied to each 0 pixel value cluster in the binary image. This locates and counts the perimeter pixels, and counts the total pixels in each cluster for area determination.

The size and shape of each cluster of zeros must now be measured to determine if in fact, the cluster represents a bruise. Clearly, some dark portions of the image may not represent bruises, but may instead represent spots of dirt, dark regions caused by geometric contours on the apple, or slight variations in lighting at the top and bottom edges of the apple image. These areas must not be counted as bruised areas.

To insure that only clusters of zeros that represent bruises are counted, a dimensionless measure of shape called the thinness ratio, T, is computed for each cluster of zeros where:

$$T = 4\pi(A/P^2)$$

and,
A = area of cluster
P = perimeter of cluster

The area and perimeter of each cluster is easily obtained by counting the total number of zeros in the cluster, and the number of zeros in the perimeter of the cluster.

By thresholding the value of T between a minimum and a maximum value, only clusters of a nearly circular shape will be counted. For a perfect circle, $T = 1$, and thus T is thresholded between some value less than 1 (e.g. 0.4), and some value greater than 1 (e.g. 1.5). Since most apple bruises tend to be circular in shape, this will result in only clusters that represent bruises being counted.

Finally, the total bruise area on the apple can now be easily computed, and from this, the apple can be graded.

The above process eliminates the time consuming normalization procedure employed by Taylor, and has proven experimentally to be both accurate and quick, with a grading accuracy equal to or better than U.S.-D.A. inspectors, and a speed as high as 30 apples per minute. It is expected that further refinement of the imaging and processing systems could increase the performance of the overall system considerably.

Although the invention has been illustrated in terms of a preferred embodiment, it will be understood that numerous variations and modifications can be made from those of skill in the art without departing from the true spirit and scope of the inventive concept as set forth in the following claims:

APPENDIX

```
/***********************************************************
*                                                          *
* THIS FILE CONTAINS INCLUDE STATEMENTS AND DEFINITIONS    *
* USED IN THE IMAGE PROCESSING ROUTINES                    *
*                                                          *
*                                                          *
*                                                          *
***********************************************************/ include <stdio.h>
include <curses.h> if CAMERA == 1                    /* 128 X 128 Matrix Camera */
define MAX_ROWS 128
#define MAX_COLS 128
#define CHAR_PER_LINE 513
define MAX_GRAY_LEVEL 256 else
if CAMERA == 2                    /* Line Scan Camera */
```

```
#define MAX_ROWS 64
#define MAX_COLS 249
#define CHAR_PER_LINE 997
define MAX_GRAY_LEVEL 256 endif
endif
int image[MAX_ROWS][MAX_COLS];
int image2[MAX_ROWS][MAX_COLS];
int image3[MAX_ROWS +4][MAX_COLS];
int val;
char fname[20];
int *header_ptr;
int header[512];
int num;
float total_area;
#   Makefile to create the apple processing system.

apple_process:      main.o thin_ratio.o subt_im.o filer.o inc_fname.o line_mask.
o pixel_filter.o read_image.o thrshold.o cluster.o data_file.o write_image.o
        cc -D CAMERA=2 main.o thin_ratio.o subt_im.o filer.o inc_fname.o line_mask.o
 pixel_filter.o read_image.o thrshold.o cluster.o data_file.o write_image.o -lcurs
es -f -g -o apple_process
main.o:  image.h main.c
        cc -D CAMERA=2  main.c -c -lcurses -f -g
subt_im.o:  image.h subt_im.c
        cc -D CAMERA=2 subt_im.c -c -lcurses -f -g
filer.o:  filer.c
        cc -D CAMERA=2 filer.c -c -lcurses -f -g
cluster.o:  image.h cluster.c
        cc -D CAMERA=2 cluster.c -c -lcurses -f -g
thin_ratio.o: image.h thin_ratio.c
        cc -D CAMERA=2  thin_ratio.c -c -lcurses -f -g
inc_fname.o:  inc_fname.c
        cc -D CAMERA=2 inc_fname.c -c -f -g
line_mask.o: image.h line_mask.c
        cc -D CAMERA=2 line_mask.c -c -lcurses -f -g
pixel_filter.o: image.h pixel_filter.c
        cc -D CAMERA=2 pixel_filter.c -c -lcurses -f -g
read_image.o:  image.h read_image.c
        cc -D CAMERA=2 read_image.c -c -lcurses -f -g
thrshold.o:  image.h thrshold.c
        cc -D CAMERA=2 thrshold.c -c -lcurses -f -g
data_file.o: data_file.c
        cc -D CAMERA=2 data_file.c -c -f -g
write_image.o: write_image.c
        cc -D CAMERA=2 write_image.c -c -lcurses -f -g
#include "image.h"
/************************************************************************
*      MAIN PROGRAM FOR PROCESSING APPLE IMAGES USING THE THINNESS RATIO     *
*      TECHNIQUE.                                                            *
*                                                                            *
*                                                                            *
*************************************************************************/ main()
/*<<<<<<<<<<<<<<<<<<<<<<<<<LOCAL VARIABLE DECLARATIONS>>>>>>>>>>>>>>>>>>>>>>>*/
```

```
{
    int *image_ptr;
    int *image_pointer;
    int *subt_im_ptr;
    int repeat;
    int row,column;
    int run;
    int increm;
    int threshold;
    float pixel_area;
    float min_thin_ratio;
    int mask;
    int dummy;
    char buff[10];
    char name[20];
    char *name_ptr;
    char *gets();
    char *fname_ptr;
    char *filer();
    int *read_image();
    int *line_mask();
    int *subt_im();
    int *thrshold();
    int *pixel_filter();
    void thin_ratio();
    char *inc_fname();
    int *write_image();
/*<<<<<<<<<<<<<<<<<<<<<<<<<SET PROCESSING PARAMETERS>>>>>>>>>>>>>>>>>>>>>>>>>*/
    initscr();
    clear();
    refresh();
    resetterm();
    printf("\n\n\
            *******************************************\n\
            *                                         *\n\
            *       AUTOMATIC THINNESS RATIO          *\n\
            *       PROCESSING OF APPLE IMAGES.       *\n\
            *                                         *\n\
            *******************************************\n\n");
/*<<<<<<<<<<<<<<<<<<<<<<<<<SET PROCESSING PARAMETERS>>>>>>>>>>>>>>>>>>>>>>>>>*/ printf("What value do you want the image threshold to be.");
    threshold = atoi(gets(buff));
    printf("\n\nWhat is the area in square mm that a pixel equals.");
    scanf("%f", &pixel_area);

printf("\n\nEnter the minimum thinness ratio value to be counted.\n\
            The value must be between 0 and 1.5.\n ");
    scanf("%f", &min_thin_ratio);

repeat = 1;
    while(repeat != 0)
    {
    printf("\n\nWhat horizontal line mask value.Must be odd  value less\n\
            than 255. ");
    scanf("%d",&mask);
    if ((mask + 1)/2 - mask/2 ==0)
            repeat = 1;
```

```
        else
             repeat = 0;
        }
        run = 1;
/*<<<<<<<<<<<<<<<<<ENTER THE FIRST FILE NAME>>>>>>>>>>>>>>>>>>>>>>>>>>>>*/
        printf("\nEnter group image filespec (e.g. APPL.01).\n");
        scanf("%19s",fname);
        fname_ptr = &fname[0];
        while(run != 0)
        {
        total_area=0;
/*<<<<<<<<<<<<<<<<<<<READ IN IMAGE>>>>>>>>>>>>>>>>>>>>>>>>>>>>>>>>>>>>>*/
        num = 1;
        image_ptr = read_image(filer(num,fname_ptr));
        if(image_ptr == NULL)
        break;
/*<<<<<<<<<<<<<<<<<<<<<CREATE THE LOW PASS IMAGE>>>>>>>>>>>>>>>>>>>>>>>*/
        image_pointer = line_mask(image_ptr,mask);
/*<<<<<<<<<<<<<<<<<SUBTRACT GRAYTONE IMAGE FROM THE LOW PASS IMAGE>>>>>>>>>>>>*/
        image_pointer = subt_im(image_ptr,image_pointer);
/*<<<<<<<<<<<<<<<<<<<THRESHOLD THE RESULTING IMAGE>>>>>>>>>>>>>>>>>>>>>>>>>*/
        image_pointer = thrshold(image_pointer,threshold);
/*<<<<<<<<<<<<<<<<<<CLEAR IMAGE OF STRAY PIXELS AND CLUSTER OVERLAP>>>>>>>>>>*/
        image_pointer = pixel_filter(image_pointer);
/*<<<<<<<<<<<<<<<<<<FIND THINNESS RATIO AND FILE BRUISE DATA>>>>>>>>>>>>>>>>*/
        thin_ratio(min_thin_ratio,image_pointer,pixel_area,fname_ptr);
/*<<<<<<<<<<<<<<<<<<<INCREMENT THE FILE SPEC>>>>>>>>>>>>>>>>>>>>>>>>>>>>>*/
        image_pointer = &image2[0][0];
        fname_ptr = inc_fname(fname_ptr);
        for(increm = 0;increm > 20;++increm)
                fname[increm] = *fname_ptr++;
        fname_ptr = &fname[0];
        }
}
include "image.h"

/****************************************************************************
 *      SUBROUTINE TO READ AN IMAGE FROM A FILE AND PLACE IT IN AN ARRAY    *
 *                                                                          *
 *                                                                          *
 ****************************************************************************/ int *read_image(filer)
        char *filer;
{
/* <<<<<<<<<<<<<<<<<<<<<<<<<<< LOCAL VARIABLE DECLARATIONS >>>>>>>>>>>>>>> */
        int row,column;
        int jj;
        int imag[16512];
        int *imag_ptr;
        int *image_ptr;
        FILE *in_file, *fopen();
/*-----------------PUT FILE NAME INTO AN ARRAY----------------------------*/
        printf("The fname in read is %s\n ",filer);

/*---------------------- OPEN FILE AND PUT IMAGE INTO AN ARRAY --------- */
```

```
            in_file = fopen (filer, "r");
            if(in_file == NULL)
                    {
                    printf (" Couldn't open %s for reading.\n",filer);
                    return(NULL);
                    }
            else
            {
            for(row=0; row < 16512; ++row)
                        imag[row] = getc(in_file);
            imag_ptr = &imag[513];
            for (row = 0; row < MAX_ROWS; ++row)
                    for(column = 0; column < MAX_COLS; ++column)
                                image[row][column] = *imag_ptr++;
            fclose(in_file);
            printf("Read of file %s is complete.\n",in_file);
            image_ptr = &image[0][0];
            return(image_ptr);
            }
}
include "image.h"
/*****************************************************************
 *          SUBROUTINE TO SET FILE NAMES FOR ALL IMAGES.          *
 *                                                                *
 *                                                                *
 *                                                                *
 *****************************************************************/

/*----------------------GET FIRST FILE NAME FROM USER------------------------*/ char *filer(code,fname_ptr)
      int code;
      char *fname_ptr;

{ char letter[2];
      char *ptr_letter;

if(code == 1)
            fname[7] = 'a';
      else if(code == 2)
            fname[7] = 'b';
      else if(code == 3)
            fname[7] = 'c';
      else if(code == 4)
            fname[7] = 'd';
      else
            fname[7] = 'e';
      fname[8] = '\0';
      return(fname_ptr);
}
include "image.h"

/*****************************************************************
 *                                                                *
```

```
 *       SUBROUTINE TO LOW PASS FILTER THE IMAGE LINE BY LINE               *
 *                                                                          *
 *                                                                          *
 ***************************************************************************/ int *line_mask(image_ptr,width)
                int *image_ptr;
                int width;
        { int run_sum;
                int *image_pointer;
                int avrage;
                int i;
                int imag[MAX_ROWS][MAX_COLS];
                int j;
                int index;
                int row,column;
                static char out_name[10] = {"datafile"};
                int count;

/*<<<<<<<<<<<<<<<<< EXECUTION BEGINS >>>>>>>>>>>>>>>>>>>>>>>>>>>>>>>>>>>>>>*/

/*------------------------INITIALIZATION OF COUNTERS -----------------------*/
        run_sum = 0;
        avrage = 0;
        count = 0;

/*--------------- PUT IMAGE INTO IMAGE ARRAY -------------------------------*/
        for (row = 0; row < MAX_ROWS; ++row)
                for (column = 0; column < MAX_COLS; ++column)
                        image[row][column] = *image_ptr++;
        image_ptr = &image[0][0];
/*----RUN MASK OVER IMAGE EXCEPT ROWS 0 TO WIDTH AND ROWS 250-WIDTH TO WIDTH-*/
        for ( row = 0; row < MAX_ROWS; ++row)
        {
        count = 0;
        run_sum = 0;
        for ( column = 0; column < MAX_COLS+width+1; ++column)
        {
                        index = column;
                        if(column >= MAX_COLS)
                        index = column - MAX_COLS;
        if ( column <= width-1)
                {
                run_sum = run_sum + image[row][column];
                count++;
                if(count == width)
                {
                avrage = run_sum/width;
                image2[row][column-width/2] = avrage;
                }
                }
        else
        {
```

```
        run_sum = run_sum - image[row][column-width] + image[row][index];
                avrage = run_sum/width;
          if(column-width/2 <= 249)
                image2[row][column-width/2] = avrage;
          else
                image2[row][index - width/2-1] = avrage;
            }
          }
        }
        image_pointer = &image2[0][0];
        return(image_pointer);
}
include "image.h"

/************************************************************************
 *              SUBROUTINE TO SUBTRACT TWO IMAGES                       *
 *                                                                      *
 *                                                                      *
 *                                                                      *
 ************************************************************************/ int *subt_im(image_ptr,image_pointer)
        int *image_ptr;
        int *image_pointer;
{
        int row,column;
        int dummy;

/*---------------PUT IMAGES IN ARRAYS AND SUBTRACT---------------------*/ for(row = 0; row < MAX_ROWS; ++row)
         for(column = 0; column < MAX_COLS;++column)
           {
           image[row][column] = *image_ptr++;
           image2[row][column] = *image_pointer++;
           image2[row][column]=image2[row][column]-image[row][column];
           if(image2[row][column]<0)
                image2[row][column] = 0;
           }
        image_pointer = &image2[0][0];
        image_ptr = &image[0][0];
        return(image_pointer);
}
include "image.h"
/************************************************************************
 *         SUBROUTINE TO THRESHOLD AN IMAGE TO FORM A BINARY IMAGE      *
 *                                                                      *
 *                                                                      *
 ************************************************************************/ int *thrshold(image_pointer,threshold)
        int *image_pointer;
        int threshold;

{
/*------------------LOCAL VARIABLE DECLARATIONS-----------------------*/
        int row,column;
```

```
        int value;
/*----------------PUT IMAGE INTO AN ARRAY AN THRESHOLD---------------------*/
        for (row = 0; row < MAX_ROWS; ++row)
                for(column = 0; column < MAX_COLS; ++column)
                {
                image2[row][column] = *image_pointer++;
                        {
                        if(image2[row][column] >= threshold)
                                image2[row][column] =0;
                        else
                                image2[row][column] =255;
                        }
                }
        image_pointer = &image2[0][0];
        return(image_pointer);
}
include "image.h"

/*********************************************************************
 *      SUBROUTINE TO REMOVE ISLAND PIXELS FROM CLUSTERS AND TO ADJUST       *
 *      IMAGE PIXELS SO THAT CLUSTERS DO NOT OVERLAP THE ENDS OF THE IMAGE   *
 *                                                                           *
 *                                                                           *
 *********************************************************************/
int *pixel_filter(image_pointer)
        int *image_pointer;
{
        int count;
        int pixel_count;
        int row,column;
        char dummy;
        int imag[MAX_ROWS][MAX_COLS];
        int pixel[128];
        int increm;

/*-----------------------PUT IMAGE IN AN ARRAY----------------------------*/
        for (row = 0;row < MAX_ROWS;++row)
                for (column = 0;column < MAX_COLS;++column)
                        image2[row][column] = *image_pointer++;
/*--------------REMOVE SINGLE PIXELS AND SINGLE PIXEL ROWS-----------------*/
        for(row = 1; row < MAX_ROWS-1;++row)
                for(column = 0;column < MAX_COLS;++column)
                {
                if(image2[row-1][column]==0 && image2[row+1][column] == 0)
                        image2[row][column] = 0;
                if(image2[row-1][column] == 255 && image2[row+1][column]== 255)
                        image2[row][column] = 255;
                }
        for(row = 0;row < MAX_ROWS;++row)
                for(column=1;column < MAX_COLS-1;++column)
                {
                if(image2[row][column-1]==0 && image2[row][column+1] == 0)
                        image2[row][column] = 0;
        if(image2[row][column-1]==255 && image2[row][column+1] == 255 &&
                image2[row][column] == 0)
                        image2[row][column] = 255;
```

```
/*-------------REMOVE ISLANDS OF PIXELS IN CLUSTERS-------------------------*/
    for(row = 2; row < MAX_ROWS-2;++row)
    {
            for(column=0;column < MAX_COLS;++column)
            {
            if(image2[row-2][column]==0 && image2[row+2][column] == 0)
                    {
                    image2[row-1][column] = 0;
                    image2[row][column] = 0;
                    image2[row+1][column] = 0;
                    }
            }
    }
/*------REWRITE IMAGE SO NO CLUSTERS CROSS THE 248 AND 0  COLUMNS-------------*/
    count = 1;
    pixel_count = 0;
    while(count != 0){
    for(row = 0;row < MAX_ROWS; ++row)
            {
            if(image2[row][0] == 0)
                    pixel_count = pixel_count + 1;
            if(image2[row][248]== 0)
                    pixel_count = pixel_count + 1;
            }
            if(pixel_count == 0)
            count = 0;
            else
            {
                    count = count + 1;
                    for(row = 0;row < MAX_ROWS; ++row)
                            for(column = 0;column < MAX_COLS; ++column)
                            {
                                    increm = column + 2;
                                    if(increm == MAX_COLS)
                                    increm = (column +2) - MAX_COLS;
                                    imag[row][increm]=image2[row][column];
                            }
                    for(row = 0;row < MAX_ROWS; ++row)
                            for(column = 0;column < MAX_COLS; ++column)
                                    image2[row][column]=imag[row][column];
                    pixel_count = 0;
            }
            for(row = 0;row < MAX_ROWS;++row)
                    for(column=1;column < MAX_COLS-1;++column)
                    {
            if(image2[row][column-1]==0 && image2[row][column+1] == 0)
                            image2[row][column] = 0;
    if(image2[row][column-1]==255 && image2[row][column+1] == 255 &&
            image2[row][column] == 0)
                            image2[row][column] = 255;
                    }
                    if(count > 124)
                    {
                    printf("The threshold value must be higher.\n");
                    pixel_count = 0;
                    }
```

```
        }
        image_pointer = &image2[0][0];
        return(image_pointer);
}
include "image.h"

/***********************************************************************
*       SUBROUTINE TO LOCATE AND FIND THE THINNESS RATIO OF SUSPECT    *
*       PIXEL CLUSTERS AND COMPUTE THE THINNESS RATIO AND COMPARE THE  *
*       RESULT TO A PRESET MAXIMUM AND MINIMUM THINNESS RATIO VALUES.  *
*                                                                      *
*                                                                      *
***********************************************************************/
int thin_ratio(min_thin_ratio,image_pointer,pixel_area,fname_ptr)
        float pixel_area;
        char *fname_ptr;
        float min_thin_ratio;
        int *image_pointer;
{
        int yrow;
        int ycolumn;
           void cluster();
/*-------------------PUT THE IMAGE INTO AN ARRAY---------------------*/
        for(yrow = 0;yrow < MAX_ROWS; ++yrow)
                for(ycolumn = 0;ycolumn < MAX_COLS; ++ycolumn)
                        image2[yrow][ycolumn] = *image_pointer++;
        for(yrow = 0;yrow < MAX_ROWS +2; ++yrow)
                for(ycolumn = 0;ycolumn < MAX_COLS; ++ycolumn)
                if(yrow ==0 || yrow == MAX_ROWS+1)
                        image3[yrow][ycolumn] = 255;
                else
                        image3[yrow][ycolumn] = image2[yrow - 1][ycolumn];

image_pointer = &image3[0][0];
/*---------------SCAN IMAGE FOR PIXEL CLUSTER------------------------*/
        for(yrow = 0;yrow < MAX_ROWS + 2;++yrow)
                for(ycolumn = 0;ycolumn < MAX_COLS; ++ycolumn)
                        if(image3[yrow][ycolumn] == 0)
                                cluster(yrow,ycolumn,image_pointer,min_thin_ratio,
                                        pixel_area,fname_ptr);
        for(yrow = 0;yrow < MAX_ROWS; ++yrow)
                for(ycolumn = 0;ycolumn < MAX_COLS; ++ycolumn)
                        image2[yrow][ycolumn]=image3[yrow + 1][ycolumn];
        image_pointer = &image2[0][0];
        total_area = 0;
        return(image_pointer);
}
include "image.h"
#include <math.h>
/***********************************************************************
*               SUBROUTINE FOR CLUSTER ANALYSIS                        *
*                                                                      *
*                                                                      *
***********************************************************************/
void cluster(yrow,ycolumn,image_pointer,min_thin_ratio,pixel_area,fname_ptr)
        int *image_pointer;
        float pixel_area;
```

```
        char *fname_ptr;
        int yrow,ycolumn;
        float min_thin_ratio;
{
        float thin_ratio;
        int count;
        int pixel1,pixel2;
        int wrow1,wrow2;
        int wcol1,wcol2;
        int posit_row1,posit_row2;
        int posit_col1,posit_col2;
        int perim,area1;
        int row,column;
        int imag[MAX_ROWS +2][MAX_COLS];
        int max_value[MAX_ROWS+2];
        int min_value[MAX_ROWS+2];
        int max_wrow,min_wrow;
/*-------------INITIALIZE THE PRESENT CLUSTER LOCATION---------------------*/
        wrow2 = yrow;
        wcol2 = ycolumn;
/*------------------PUT THE IMAGE INTO AN ARRAY---------------------------*/
        for(row = 0;row < MAX_ROWS +2; ++row)
                for(column = 0;column < MAX_COLS; ++column)
                        image3[row][column] = *image_pointer++;
/*----INITIALIZE A SECOND IMAGE ARRAY AND MAXIMUM MINIMUM ROW ARRAYS---------*/
        perim = 0;
        area1 = 0;
        max_wrow = 0;
        min_wrow = 64;
        for (row = 0;row < MAX_ROWS +2; ++row)
                {
                        max_value[row] = 0;
                        min_value[row] = 255;
                        for(column = 0;column < MAX_COLS; ++column)
                                imag[row][column] = 255;
                }
/*------------------SET PARAMETERS FOR BEGINNING CLUSTER POSITION-----------*/
        count = 1;
        min_wrow = wrow2;
        posit_row1 = wrow2;
        posit_col1 = wcol2 - 1;
        posit_row2 = wrow2;
        posit_col2 = wcol2;
        wrow1 = wrow2;
        wcol1 = wcol2 - 1;
/*-----------------------TRACE THE CLUSTER PERIMETER-----------------------*/
        pixel1 = image3[wrow1][wcol1];
        while(count != 0){
        pixel2 = image3[wrow2][wcol2];
/*---------------STORE MAXIMUM AND MINIMUM COLUMN VALUES FOR EACH ROW--------*/
                if(max_wrow < wrow1)
                        max_wrow = wrow1;
                if(min_wrow > wrow1)
                        min_wrow = wrow1;
                if(max_value[wrow1] < wcol1)
                        max_value[wrow1] = wcol1;
                if(min_value[wrow1] > wcol1)
```

```
                    min_value[wrow1] = wcol1;
            if(pixel2 ==0 )
                    imag[wrow2][wcol2] = 1;
/*-----------------FIND WHICH DIRECTION TO TURN-----------------------*/
    if(wrow2-wrow1 != 0)
      {
      if(wrow2 - wrow1 == 1 && pixel2 > 0)
      {
              wcol1 = wcol2;
              wcol2 = wcol2 - 1;
              wrow1 = wrow2;
      }
      else if(wrow2 - wrow1 == -1 && pixel2 > 0)
      {
              wcol1 = wcol2;
              wcol2 = wcol2 +1;
              wrow1 = wrow2;
      }
      else if(wrow2 - wrow1 == 1 && pixel2 <= 1)
      {
              wcol1 = wcol2;
              wcol2 =wcol2 + 1;
              wrow1 = wrow2;
      }
      else
      {
              wcol1 = wcol2;
              wcol2 = wcol2 - 1;
              wrow1 = wrow2;
      }
      }
    else
      {
      if(wcol2 - wcol1 == 1 && pixel2 > 0)
      {
              wrow1 = wrow2;
              wrow2 = wrow2 + 1;
              wcol1 = wcol2;
      }
      else if(wcol2 - wcol1 == -1 && pixel2 > 0)
      {
              wrow1 = wrow2;
              wrow2 = wrow2 - 1;
              wcol1 = wcol2;
      }
      else if(wcol2 - wcol1 == 1 && pixel2 <= 1)
      {
              wrow1 = wrow2;
              wrow2 = wrow2 - 1;
              wcol1 = wcol2;
      }
      else
      {
              wrow1 = wrow2;
              wrow2 = wrow2 + 1;
              wcol1 = wcol2;
      }
```

```
            }
        pixel1 = pixel2;
        if(wrow2 == posit_row2 && wcol2 == posit_col2)
            count = 0;
    }
/*-------------------FILL IN CLUSTER AREA WITH 5-----------------------*/
    for(row = min_wrow;row < max_wrow; ++row)
            for (column = min_value[row]; column < max_value[row];++column)
                {
                    if(image3[row][column] == 0 && imag[row][column]>1)
                        imag[row][column] = 5;
/*-------------------FIND CLUSTER PERIMETER AND AREA IN PIXELS---------------*/
                    if(imag[row][column] == 1)
                        perim = perim + 1;
                    if(imag[row][column] == 5)
                        area1 = area1 + 1;
                }
/*----------------ADD PERIMETER AND AREA PIXELS FOR TOTAL AREA----------------*/
    area1 = area1 + perim;
/*----------------FIND THINNESS RATIO FOR CLUSTER----------------------------*/
    thin_ratio = (4*M_PI*area1)/(perim*perim);
    for(row = min_wrow;row < max_wrow;++row)
    {
            for(column=min_value[row];column<max_value[row];++column)
            {
                    if(thin_ratio>1.599 || thin_ratio < min_thin_ratio)
                            image3[row][column] = 255;
                    else
                    if(imag[row][column] >= 1)
                    image3[row][column] = val + 1;
            }
    }
    if(thin_ratio < 1.599 && thin_ratio > min_thin_ratio)
            data_file(area1,pixel_area,fname_ptr);
    return;
#include <stdio.h>
#include "image.h"
/****************************************************************************
 *   SUBROUTINE TO OPEN A FILE FOR STORING APPLE BRUISE DATA DURING         *
 *   PROCESSING.                                                             *
 *                                                                           *
 *                                                                           *
 ****************************************************************************/
void data_file(area1,pixel_area,fname_ptr)
    int area1;
    float pixel_area;
    char *fname_ptr;
{
    float result;
    int increm;
    static char out_name[10] = {"datafile"};
    char fname[20];
    FILE *out_file, *fopen ();

for(increm = 0;increm < 19; ++increm)
            fname[increm] = *fname_ptr++;
    fname_ptr = &fname[0];
```

```
/*--------------COMPUTE THE AREA OF THE BRUISE IN SQ. mm--------------------*/
      result = area1*pixel_area;
      total_area=total_area+result;
/*--------------OPEN THE FILE TO PUT IN DATA--------------------------------*/
      out_file = fopen (out_name, "a+");
      if (out_file == NULL)
            printf("Couldn't open %s for writing.",out_name);
      fprintf(out_file,"\nFor apple %s the area is %f, total = %f",fname,result,to
tal_area);
      fclose(out_file);
      return;
} include "image.h"
/****************************************************************************
*    SUBROUTINE TO INCREMENT THE FILESPEC TO PROCESS THE NEXT IMAGE         *
*                                                                            *
*                                                                            *
****************************************************************************/
char *inc_fname(fname_ptr)
      char *fname_ptr;
{
      int increm;

/*-----------------------PLACE FILE NAME INTO AN ARRAY----------------------*/
      for(increm = 0;increm <20;++increm)
            fname[increm] = *fname_ptr++;
      if(fname[6] == '9')
         {
            fname[6] = '0';
            fname[5] = fname[5] + 1;
         }
      else
            fname[6] = fname[6] + 1;
      fname[7] = '\0';
      printf("\nThe new fname is %s",fname);
      fname_ptr = &fname[0];
      return(fname_ptr);
}
```

What is claimed is:

1. A method for optically determining the amount of bruise area on the surface of a piece of fruit comprising the steps of:
   obtaining a two-dimensional gray level image of a piece of fruit with a line scan camera,
   transferring image data from the camera to a data processor;
   filtering the image data to eliminate interference and noise in the image;
   thresholding the image data to generate a two-dimensional binary image including a plurality of data words having only two different values; a first value of which is indicative of a dark spot on a piece of fruit;
   counting clusters of data words of said first of said values to determine their area and shape;
   determining from the shapes of said clusters which of said clusters represent bruises; and
   determining from the clusters which represent bruises, the area on the surface of a piece of fruit covered by such bruises.

2. The method of claim 1, wherein said line scan camera includes a plurality of pixels, and said step of obtaining the image with the line scan camera includes:
   (a) rotating a piece of fruit in front of the camera; and,
   (b) generating a plurality of start pulses for said line scan camera as the fruit rotates to produce a two-dimensional image having a plurality of rows of data words having values which are proportional to the gray level sensed by the individual pixels as the fruit rotates.

3. The method of claim 2, wherein said step of filtering the image data comprises:
   substituting the value of each data word in each row with an average of the values of that data word and a plurality of adjacent data words in that row;
   subtracting the original value of each data word from the substituted value for each same data word; and,
   setting the value of any data word having a negative value after said subtraction to zero.

4. The method of claim 3, wherein said step of thresholding the image data includes:
comparing each data word value in the filtered image with an arbitrarily chosen threshold value;
setting the values of all data words having a pixel value greater than or equal to said threshold value to zero;
setting the values of all data words having a pixel value less than said threshold value to a value greater than zero; and,
wherein said first value indicative of a dark spot is zero.

5. The method of claim 4, wherein said step of counting clusters of data words having a zero value includes:
counting the number of data words in each cluster of zero pixel valued data words to calculate the area of each cluster;
counting the number of data words in the perimeter of each cluster of zero pixel valued data words to determine the perimeter of each cluster; and,
from said area and perimeter measurements, determining the shape of each cluster of zero pixel valued data words.

6. The method of claim 5 further including:
determining which clusters of zero pixel valued data words have shapes that are nearly circular; and,
counting only those clusters that are nearly circular in shape as representative of bruises on a piece of fruit.

7. A method for optically determining the amount of bruise area on the surface of a piece of fruit comprising the steps of:
obtaining a two-dimensional gray level image of a piece of fruit with a multiple pixel line scan camera, said image having a plurality of rows of data words with values that are proportional to the gray level sensed by each pixel of the camera as a piece of fruit is rotated in front of the camera;
transferring image data from the camera to a data processor;
obtaining a filtered image by substituting the value of each data word in each row with an average of the values of that data word and a plurality of adjacent data words in that row; subtracting the original value of each data word from the substituted value for each same data word; and, setting the value of any data word having a negative value after said subtraction to zero;
obtaining a thresholded image by comparing each data word value in the filtered image with an arbitrarily chosen threshold value; setting the values of all data words having a pixel value greater than or equal to said threshold value to a zero value; and, setting the values of all data words having a pixel value less than said threshold value to a second value greater than zero;
obtaining a further filtered image by changing the values of any zero valued data words in the thresholded image that are surrounded in the image by data words having said second value to said second value, and changing the values of any second valued data words in the thresholded image that are surrounded in the image by zero valued data words to zero;
obtaining a shifted image by shifting the further filtered image so that no zero valued data words are present at the beginning of any of the rows of data words;
determining the size of clusters of zero valued data words in the shifted image by counting the number of zero valued data words in the perimeter of each cluster to determine the size of the perimeter of each cluster, and counting the total number of zero valued data words in each cluster to determine the area of each cluster;
determining from the sizes of each of the cluster perimeters and areas, which of the clusters are nearly circular in shape; and,
counting the total number of zero valued data words in all of the clusters having a nearly circular shape to determine the amount of bruised surface area on a piece of fruit.

8. A method for optically determining the amount of bruise area on the surface of a piece of fruit comprising the steps of:
obtaining a digital two-dimensional gray level image of a piece of fruit;
filtering the image data to eliminate interference and noise in the image;
thresholding the image data to generate a two-dimensional binary image including a plurality of data words having only two different values, a first value of which is indicative of a dark spot on a piece of fruit;
counting clusters of data words of said first of said values to determine their area and shape;
determining from the shapes of said clusters which of said clusters represent bruises; and
determining from the clusters which represent bruises; the area on the surface of a piece of fruit covered by such bruises.

* * * * *